United States Patent [19]

Miller

[11] Patent Number: 5,287,916

[45] Date of Patent: Feb. 22, 1994

[54] APPARATUS AND METHOD FOR DISPOSING LIQUID EFFLUENT FROM A LIQUID SYSTEM

[75] Inventor: Glenn E. Miller, Mocksville, N.C.

[73] Assignee: Ingersoll-Rand Company, Woodcliff Lake, N.J.

[21] Appl. No.: 21,817

[22] Filed: Feb. 24, 1993

[51] Int. Cl.⁵ .................... F04B 39/06; F04B 39/16
[52] U.S. Cl. ............................ 165/113; 417/243; 137/195
[58] Field of Search .................. 165/111, 113, 119; 417/243; 137/192, 195

[56] References Cited

U.S. PATENT DOCUMENTS

| | | | |
|---|---|---|---|
| 2,017,418 | 10/1935 | Hasche | 417/243 X |
| 4,112,968 | 9/1978 | Hoffman et al. | 137/195 X |
| 4,602,680 | 7/1986 | Bradford | 417/243 X |
| 4,779,640 | 10/1988 | Cummings et al. | 137/195 |
| 4,838,343 | 6/1989 | Bogue | 165/111 X |
| 5,145,000 | 9/1992 | Kluppel | 165/113 |
| 5,240,386 | 8/1993 | Amin et al. | 417/243 |

Primary Examiner—John Rivell
Attorney, Agent, or Firm—Victor M. Genco, Jr.

[57] ABSTRACT

An apparatus for disposing liquid effluent which has been separated from a fluid system includes a compressor for supplying a compressed fluid to the fluid system. An engine for driving the compressor has an exhaust system which vents an exhaust fluid to an atmosphere external to the fluid system. An aftercooler is flow connected to an outlet of the compressor. A separating means for removing liquid effluent from the compressed fluid is flow connected to the aftercooler. The separating means has a conduit through which the separated liquid effluent flows. A reservoir for collecting the liquid effluent is flow connected in fluid receiving relation to the conduit of the separating means and flow connected in fluid supplying relation to the exhaust system of the engine. During operation, the collected liquid effluent flows from the reservoir into the exhaust system, whereupon entry therein, the exhaust fluid vaporizes the liquid effluent.

18 Claims, 1 Drawing Sheet

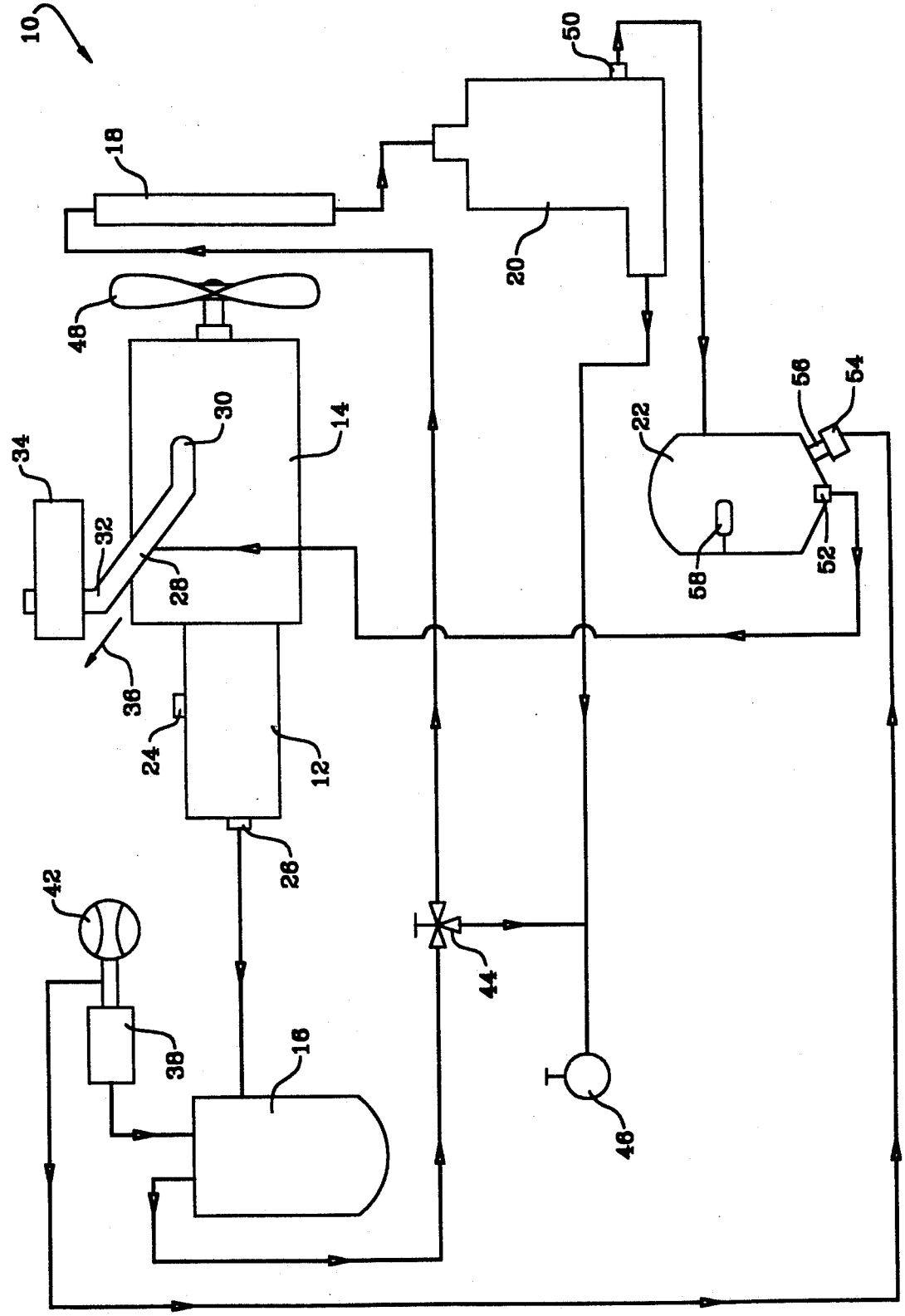

APPARATUS AND METHOD FOR DISPOSING LIQUID EFFLUENT FROM A LIQUID SYSTEM

BACKGROUND OF THE INVENTION

This invention relates generally to compressed fluid systems, and more particularly to an apparatus and method for disposing liquid effluent which has been separated from a compressed air system.

During the compression of air, heat is generated. To overcome the detrimental effects of the heat generated by the compression process, typically oil is mixed with the compressed air. Additionally, downstream of the compressor, a heat exchanger is typically employed to cool the compressed air, which thereby condenses any water and oil vapors present within the compressed air.

It has long been recognized that it is desirable to dry compressed air before its use by an object of interest. In this regard, typically a moisture separator is employed to remove the condensed water vapor and oil vapor (effluent condensate) from the compressed air stream. The effluent condensate, comprising both water and oil, is then collected in a sump area where it typically is continuously discharged on the ground surrounding the compressor. Therefore, during a predetermined period of time, it is not unusual for relatively large quantities of oil to be discharged directly into the environment.

The foregoing illustrates limitations known to exist in present compressed fluid systems which employ a heat exchanger to cool a compressed fluid and a moisture separator to dry the compressed fluid. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a compressor for supplying a compressed fluid to a fluid system. The compressor includes an inlet and an outlet. A means for driving the compressor includes an exhaust system which vents an exhaust fluid. A means for cooling the compressed fluid is flow connected in fluid receiving relation to the outlet of the compressor. A separating means for removing liquid effluent from the compressed fluid is flow connected in fluid receiving relation to the cooling means. The separating means includes a conduit through which the separated liquid effluent flows. A reservoir for collecting the liquid effluent is flow connected in fluid receiving relation to the conduit of the separating means and flow connected in fluid supplying relation to the exhaust system of the compressor drive means. The collected liquid effluent flows from the reservoir into the exhaust system wherein the exhaust fluid vaporizes the liquid effluent.

The foregoing and other aspects will become apparent from the following detailed description of the invention when considered in conjunction with the accompanying drawing figure.

BRIEF DESCRIPTION OF THE DRAWING FIGURES

The only FIGURE illustrated in the drawing is a schematic representation of the apparatus constructed in accordance with the invention.

DETAILED DESCRIPTION

Referring to the FIGURE, there is illustrated generally at 10 a schematic representation of a preferred embodiment of a compressed air system in accordance with the teachings of the present invention. The compressed air system 10 includes a compressor 12, a compressor drive means or engine 14, a first reservoir, or receiver 16, a heat exchanger or aftercooler 18, a separating means or moisture separator 20 and a second reservoir or drain trap 22.

As used herein the term compressor is defined as any type of oil-free or oil-injected rotary, reciprocating, or centrifugal pump for raising the pressure of a gas, such as air. Although the present invention is particularly well suited for use with a compressed air system having an oil-injected type compressor, the present invention is also suited for use with a compressed air system having an oil-free type compressor design.

Compressor 12 is an oil-injected, positive displacement type compressor such as an oil-injected rotary screw compressor, or an oil-injected reciprocating compressor. Compressor 12 has an inlet 24 and an outlet 26. Outlet 26 is flow connected in compressed air supplying relation to the first reservoir or receiver 16.

The compressor drive means 14 is disposed in motive force transmitting relation to compressor 12 to power the compressor for use in the compressed air system 10. In the preferred embodiment, the compressor drive means 14 is a combustion engine such as a gasoline or diesel engine, for example. However, whatever the type engine that is utilized, the engine 14 must include an exhaust system 28 which vents an exhaust fluid (not shown) to an atmosphere external to the compressed air system 10.

The exhaust system 28 includes a first end 30 and a second end 32, the first end 30 mounting on the engine 14 in a suitable predetermined location. An exhaust system attenuating device 34, such as a muffler, is mounted on the second end 32 of the exhaust system 28. The exhaust fluid has a predetermined exhaust fluid temperature and flows within the exhaust system in a predetermined direction. In the preferred embodiment, the exhaust fluid flows within the exhaust system 28 in a flow direction away from the engine 14, as generally indicated by the direction arrow 36. The predetermined temperature of the exhaust fluid must be of sufficient magnitude to vaporize a liquid effluent, such as an effluent mixture comprising water and oil condensate.

The first reservoir or receiver 16 is flow connected in compressed air receiving relation to the outlet 26 of the compressor 12. The receiver 16 receives and stores compressed air which is discharged from the compressor outlet 26. Flow connected on the receiver 16 is a normally closed, first valve means or pilot operated blowdown valve 38. The pilot operated blowdown valve is operable to depressurize the compressed air system 10, such as during periods of non-use or system maintenance. The blowdown valve 38 is actuated to an open or system venting position immediately upon shutdown of the engine 14. The blowdown valve may be actuated to the open position by any suitable means, such as by a solenoid or pneumatic signal, for example. The blowdown valve 38 includes an orifice 42 through which the vented compressed air flows. Additionally, the blowdown valve 38 is operable to supply a predetermined signal to an object of interest. The receiver 16 may be flow connected in compressed air supplying relation to a three-way valve 44. In this regard, the three-way valve 44 may supply compressed air directly to a service valve 46 for use by an object of interest, or the three-way valve 44 may supply the compressed air to the heat exchanger or aftercooler 18.

The aftercooler 18 represented in the FIGURE is an air to air type aftercooler, however, any suitable type aftercooler may be utilized. The aftercooler 18 is of conventional design and is operable to cool the compressed air discharged from the compressor 12 to thereby condense a predetermined amount of water and oil vapor, effluent condensate, from the compressed air. A fan 48 is rotatably mounted on, and powered by, the engine 14. The fan 48 supplies a cooling fluid across the aftercooler 18. The aftercooler 18 is flow connected in compressed fluid supplying relation to the separating means or moisture separator 20.

The moisture separator 20 is flow connected in compressed air supplying relation to the service valve 46. The moisture separator 20 is operable to remove the effluent condensate from the compressed air stream. In the preferred embodiment, the moisture separator 20 is of a centrifugal type, and includes a conduit 50 through which the effluent condensate flows to the second reservoir or drain trap 22.

The drain trap 22 is an automatic, float type drain trap having a predetermined volume capacity. The drain trap 22 includes a discharge port 52 and a normally closed drain valve 54 which may be actuated by a normally closed pilot valve 56. The drain trap 22, via the discharge port 52, is flow connected in fluid supplying relation to the exhaust system 28. As should be understood, the pilot valve 56 is connected in signal receiving relation to the blowdown valve 38. In the preferred embodiment, the pilot valve 56 is connected in pneumatic signal receiving relation to the blowdown valve 38.

In operation, air is compressed and heated by the compressor 12. The compressed air is then received by, and stored in, the receiver 16. By action of the three way valve 44, the compressed air in the receiver 16 may be routed directly to the service valve 46, or the compressed air may be routed to the aftercooler 18. Upon entering the aftercooler 18, the compressed air is cooled which condenses the water and oil vapor in the compressed air stream. The effluent condensate and the compressed air then flow to the moisture separator 20 which removes substantially all of the effluent condensate from the compressed air stream. The "dry" compressed air flows to the service valve 46 for use by an object of interest. The effluent condensate flows from the moisture separator 20 through the conduit 50 and into the drain trap 22.

As the drain trap 22 fills with effluent condensate, the float 58 rises to a predetermined position which opens the discharge port 52 which permits the effluent condensate to flow from the drain trap, under system pressure, to the exhaust system 28. Upon reaching the exhaust system, the effluent condensate is injected into the exhaust system in the direction of the exiting exhaust fluid at a location substantially adjacent to the exhaust system attenuating member 34. Upon entry therein, the effluent condensate is vaporized by the hot exhaust fluid, and any minute quantities of oil are burned. As should be understood, the drain trap 22 must have a sufficiently small volume capacity to preclude any damage of engine 14 caused by a volume of effluent condensate, too large to be vaporized by the exhaust fluid, to be injected into the exhaust system 28.

Upon shutdown of engine 14, a signal (mechanical, pneumatic, or electro-mechanical, for example) is sent to the pilot operated blowdown valve 38 to permit venting of the compressed air system 10. When the blowdown valve 38 opens, a back pressure is established between the blowdown valve and the orifice 42 which provides a pneumatic signal to open the normally closed pilot valve 56 which opens the drain valve 54 to drain effluent condensate from the drain trap 22. In this regard, as long as the blowdown valve 38 is open, the drain valve 54 is also open. When the receiver 16 blows down to a predetermined system pressure, and there is no longer any compressed air discharging from the orifice 42, the pneumatic signal terminates which thereby permits the pilot valve 5 and the drain valve 54 to return to their respective closed positions.

Drain trap 22 is drained upon shutdown of engine 14 to prevent the injection of effluent condensate into the exhaust system 28 at engine start-up, before the exhaust fluid reaches the predetermined vaporizing temperature, to prevent effluent condensate from draining back into the engine 14. Drain trap 22 is also drained upon shutdown of the engine 14 to prevent the effluent condensate in the drain trap 22 from freezing in certain environmental conditions.

While this invention has been illustrated and described in accordance with a preferred embodiment, it is recognized that variations and changes may be made therein without departing from the invention as set forth in the following claims.

Having described the invention, what is claimed is:

1. An apparatus comprising:
    a compressor means for supplying a compressed fluid to a fluid system, the compressor means having an inlet and an outlet;
    a means for driving the compressor means, the compressor drive means having an exhaust system which vents an exhaust fluid;
    a means for cooling the compressed fluid, the cooling means flow connected in fluid receiving relation to the outlet of the compressor means;
    a separating means for removing liquid effluent from the compressed fluid, the separating means flow connected in fluid receiving relation to the cooling means, the separating means having a conduit through which the separated liquid effluent flows; and
    a reservoir for collecting the liquid effluent, the reservoir flow connected in fluid receiving relation to the conduit of the separating means and flow connected in fluid supplying relation to the exhaust system of the compressor drive means, the collected liquid effluent flowing from the reservoir into the exhaust system, the exhaust fluid vaporizing the liquid effluent.

2. An apparatus as claimed in claim 1, and wherein a tank member is flow connected in fluid receiving relation to the outlet of the compressor means.

3. An apparatus as claimed in claim 2, and wherein the tank member has flow connected thereto a first valve means for venting a predetermined volume of compressed fluid from the fluid system to the atmosphere, the first valve means being actuated to an open, compressed fluid venting position upon shut down of the compressor drive means.

4. An apparatus as claimed in claim 3, and wherein the reservoir includes a second valve means for draining the collected liquid effluent from the reservoir to a predetermined location external to the fluid system.

5. An apparatus as claimed in claim 4, and wherein the first valve means includes a pilot valve and an orifice means for venting compressed fluid.

6. An apparatus as claimed in claim 5, and wherein the second valve means includes a pilot valve responsive to a predetermined signal.

7. An apparatus as claimed in claim 6, and wherein the first valve means is connected in signal transmitting relation to the second valve means to position the second valve means in direct relation to the position of the first valve means.

8. An apparatus as claimed in claim 6, and wherein the first valve means is flow connected in pneumatic signal supplying relation to the second valve means, and whereupon compressor shutdown, the first valve means is positioned in the open position to vent the compressed fluid through the orifice means, the venting creating a back pressure upstream of the orifice means which thereby provides a pneumatic signal to the pilot valve of the second valve means, the pilot valve opening the second valve means to drain the liquid effluent from the reservoir, and whereupon completion of the venting, the first valve means returns to the closed position which thereby terminates the pneumatic signal to the second valve means which permits the pilot valve of the second valve means to return to the closed position which thereby closes the second valve means.

9. An apparatus as claimed in claim 1, and wherein the means for driving the compressor means includes an exhaust attenuating device, and wherein the liquid effluent flows from the reservoir, under fluid system pressure, into the exhaust system at a location in the exhaust system substantially adjacent to the exhaust attenuating member.

10. An apparatus as claimed in claim 1, and wherein the reservoir includes a discharge port and a float means for actuating the discharge port, and filling of the reservoir with a predetermined volume of collected liquid effluent causes the float means to rise to a predetermined position which actuates the discharge port to an open position to permit liquid effluent to flow from the reservoir to the exhaust system.

11. An apparatus for disposing liquid effluent which has been separated from a compressed air system, the apparatus comprising:
a compressor means for supplying compressed air to the system, the compressor means having an inlet and an outlet;
a means for driving the compressor means, the compressor drive means having an exhaust system which vents an exhaust fluid, having a predetermined exhaust temperature, to an atmosphere external to the compressed air system, the exhaust fluid flowing from the compressor drive means in a predetermined direction;
a first reservoir flow connected in air receiving relation to the outlet of the compressor means;
a first valve means for venting a predetermined volume of compressed air from the system to the atmosphere, the first valve means flow connected to the first reservoir and actuated to an open, compressed air venting position upon shut down of the compressor drive means;
an aftercooler flow connected in air receiving relation to the first reservoir;
a separating means for removing liquid effluent from the compressed air, the separating means flow connected in fluid receiving relation to the aftercooler and flow connected in fluid supplying relation to an object of interest, the separating means having a conduit through which the separated liquid effluent flows; a second reservoir for collecting the liquid effluent, the second reservoir flow connected in fluid receiving relation to the conduit of the separating means and flow connected in fluid supplying relation to the exhaust system of the compressor drive means; and
a second valve means for draining the liquid effluent from the second reservoir to a predetermined location external to the compressed air system, the second valve means flow connected to the second reservoir, and wherein the collected liquid effluent flows from the reservoir into the exhaust system, in the direction of the exhaust fluid flow, whereupon entry therein, the exhaust fluid vaporizes the liquid effluent, and shutdown of the compressor drive means actuates the first valve means to the open position to vent a predetermined volume of the compressed air from the system.

12. An apparatus as claimed in claim 11, and wherein the first valve means includes a pilot valve and an orifice means for venting the compressed air.

13. An apparatus as claimed in claim 12, and wherein the second valve means includes a pilot valve responsive to a predetermined signal.

14. An apparatus as claimed in claim 13, and wherein the first valve means is connected in signal supplying relation to the second valve means to thereby actuate and position the second valve means in direct relation to the position of the first valve means.

15. An apparatus as claimed in claim 13, and wherein the first valve means is flow connected in pneumatic signal supplying relation to the second valve means, and whereupon compressor shutdown, the first valve means is positioned in the open position to vent the compressed air through the orifice means, the venting creating a back pressure upstream of the orifice means which thereby provides a pneumatic signal to the pilot valve of the second valve means, the pilot valve opening the second valve means to drain the liquid effluent from the second reservoir, and whereupon completion of the venting, the first valve means returns to the closed position which thereby terminates the pneumatic signal to the second valve means which permits the pilot valve of the second valve means to return to the closed position which thereby closes the second valve means.

16. An apparatus as claimed in claim 11, and wherein the means for driving the compressor means includes an exhaust attenuating device, and wherein the volume of separated liquid effluent, within the second reservoir, flows from the second reservoir, under air system pressure, into the exhaust system at a location in the exhaust system substantially adjacent to the exhaust attenuating member.

17. An apparatus as claimed in claim 11, and wherein the second reservoir includes a discharge port and a float means for actuating the discharge port, and filling of the second reservoir with a predetermined volume of liquid effluent causes the float means to rise to a predetermined position which actuates the discharge port to an open position to permit liquid effluent to flow from the second reservoir to the exhaust system.

18. In a compressed system having a compressor which is driven by an engine, the engine having an exhaust system which vents an exhaust fluid in a predetermined flow direction to an atmosphere, a method of disposing effluent condensate from the compressed air system, the method comprising:

compressing air within the system;

cooling the compressed air to a predetermined temperature to condense effluent from the compressed air;

separating the effluent condensate from the compressed air;

collecting the separated effluent condensate in a reservoir having a predetermined volume capacity;

injecting a predetermined volume of effluent condensate into the exhaust system in the flow direction of the exhaust fluid; and vaporizing the predetermined volume of effluent condensate in the exhaust fluid.

* * * * *